(12) United States Patent
Kim et al.

(10) Patent No.: US 7,342,628 B2
(45) Date of Patent: Mar. 11, 2008

(54) LIQUID CRYSTAL DISPLAY DEVICE

(75) Inventors: Jong-Hyun Kim, Seoul (KR); Makoto Yoneya, Hitachinaka (JP); Hiroshi Yokoyama, Tsukuba (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 169 days.

(21) Appl. No.: 10/571,559

(22) PCT Filed: Sep. 13, 2004

(86) PCT No.: PCT/JP2004/013317

§ 371 (c)(1),
(2), (4) Date: Mar. 10, 2006

(87) PCT Pub. No.: WO2005/031447

PCT Pub. Date: Apr. 7, 2005

(65) Prior Publication Data

US 2007/0030429 A1   Feb. 8, 2007

(30) Foreign Application Priority Data

Sep. 29, 2003   (JP) .............................. 2003-337800

(51) Int. Cl.
*G02F 1/1337* (2006.01)
*G02F 1/1343* (2006.01)

(52) U.S. Cl. ..................... 349/129; 349/143; 349/130

(58) Field of Classification Search ................. 349/129
See application file for complete search history.

(56) References Cited

U.S. PATENT DOCUMENTS 6,342,938 B1 *   1/2002   Song et al. ................. 349/143

FOREIGN PATENT DOCUMENTS

JP   06-018885   1/1994
JP   7-72484     3/1995

* cited by examiner

*Primary Examiner*—Frank G. Font
*Assistant Examiner*—Eric Wong
(74) *Attorney, Agent, or Firm*—Oblon, Spivak, McClelland, Maier & Neustadt, P.C.

(57) ABSTRACT

A liquid crystal display device that can be fabricated more simply as compared with a conventional device and suitably used in a liquid crystal display television satisfying both high pixel transmittance and wide viewing angle display characteristics is provided. The liquid crystal display device includes a pair of substrates including at least one transparent substrate, a liquid crystal layer interposed between the pair of substrates, and a liquid crystal alignment layer interposed between the liquid crystal layer and at least any one of the pair of substrates. On the liquid crystal alignment layer, a plurality of closed regions having a liquid crystal alignment direction different from the surrounding liquid crystal alignment direction are arranged. In the liquid crystal display element, each of the closed regions has such a shape that the head and tail are distinguishable along the surrounding liquid crystal alignment direction.

7 Claims, 6 Drawing Sheets

(a)   (b)

(c)

(a)

(b)

(c)

(d)

(a)        (b)

(a)        (b)

(c)

LIQUID CRYSTAL DISPLAY DEVICE

TECHNICAL FIELD

The present invention relates to a liquid crystal display device, and in particular, to a liquid crystal display device satisfying high transmittance and wide viewing angle range.

BACKGROUND ART

Liquid crystal display devices are used as displays for notebook computers, desktop computers, and the like, utilizing their features such as space-saving due to a small thickness, and low power consumption. Furthermore, because of the recent improvement of the technique of producing a liquid crystal panel having a large screen, liquid crystal display devices have also been used as displays for televisions, most of which were hitherto cathode-ray tube-based. Although a twisted nematic (TN) display mode has been mainly used in a liquid crystal display device, the TN display mode cannot provide satisfactory viewing angle characteristics. Accordingly, as such an increase in the screen size of liquid crystal display devices advances, liquid crystal display devices utilizing display modes different from the TN display mode have been proposed in order to improve the viewing angle characteristics. Such new display modes have been used in large liquid crystal display televisions as alternatives to the TN display mode.

Examples of such display modes of a liquid crystal display element for improving viewing angle characteristics include an in-plane switching (IPS) display mode described in Patent Document 1 and a multi-domain vertical alignment (MVA) display mode described in Patent Document 2.

Patent Document 1: Japanese Unexamined Patent Application Publication No. 6-160878
Patent Document 2: Japanese Unexamined Patent Application Publication No. 11-242225
Patent Document 3: Japanese Unexamined Patent Application Publication No. 63-106624
Patent Document 4: Japanese Unexamined Patent Application Publication No. 8-304828
Non-Patent Document 1: de Boer et al., Proc. International Display Workshop '02, LCT4-3., p. 69
Non-Patent Document 2: T. Hashimoto et al., Society of Information Display '95 Digest, 41-4, p. 877

DISCLOSURE OF THE INVENTION

However, in the above two known arts (IPS mode and MVA mode), it is known that the pixel transmittance in the full white level (white luminance) is lower than that in the TN display mode. This white luminance is an element directly relating to the peak display luminance, which is one of the most important elements of display image quality especially in a liquid crystal display device used for liquid crystal display television. The low white luminance is one of the important technical problems in a liquid crystal display device used for a liquid crystal display television which is significantly different from a display device for a computer in which the luminance necessarily has an upper limit in view of asthenopia caused by continuously watching the display for a long time.

The specific reason that, among the known arts, the IPS mode has a white luminance lower than that in the TN mode is as follows. In the IPS mode, as indicated by its name, a horizontal electric field component in a substrate plane is generated by a potential difference applied to interdigitated electrodes provided on a surface of the substrate. The generation of the horizontal electronic field component changes the orientation of liquid crystal molecules to display a black to white gradation. Therefore, the areas of electrodes on which the horizontal electric field is not generated (because of no potential difference) do not fundamentally contribute to the white luminance.

The reason that the other MVA mode has a white luminance lower than that in the TN mode is as follows. In a display with the MVA mode, as indicated by its name, a single pixel is divided into a plurality of pixel domains (in general, a pixel is divided into four domains) wherein the orientation of liquid crystal molecules are different from each other. The boundary areas of divided domains do not contribute to the white luminance. Since the division of pixel is theoretically essential in order to improve viewing angle characteristics in the MVA mode using a homeotropic alignment of liquid crystals, the decrease in white luminance in the domain boundaries is also inevitable.

Unlike the MVA mode, the former IPS mode uses a homogeneous alignment. Therefore, satisfactory viewing angle characteristics can be achieved even without a multi-domain structure. However, in order to improve characteristics of change in colors when the device is viewed from an oblique direction, it is necessary to form a multi-domain structure. (A method of dividing a pixel into two domains is generally used by optimizing the shape of electrodes.) In this case, the domain boundary areas cause the decrease in white luminance as in the MVA mode.

On the other hand, as disclosed in, for example, Patent Document 3, a multi-domain structure is applied to the TN mode which has high white luminance, thereby improving viewing angle characteristics. This technique was proposed before the IPS mode and the MVA mode. For example, according to Non-Patent Document 1, it is reported that when the multi-domain structure is applied to the TN mode, the decrease in the white luminance in the domain boundaries, which is a problem in the above MVA mode, can be suppressed.

However, this multi-domain TN mode is not hitherto in practical use. The reason for this is as follows. Unlike the MVA mode and the like, the application of a multi-domain structure to the TN mode requires the following structure: An alignment layer is provided on the surface of a substrate that sandwiches a liquid crystal layer, and the multi-domain structure must be applied to the orientation state (pretilt) itself of liquid crystal molecules on the alignment layer. In this case, the productivity for mass production is significantly low. Examples of a proposed method of providing the multi-domain structure to the orientation state of liquid crystals on the surface of the substrate in the TN mode include the following. Patent Document 3 discloses a method of performing a plurality of times of mask rubbing including a step of rubbing, applying a resist, patterning the resist, and removing the resist pattern, as a surface orientation processing. Patent Document 4 discloses a method of performing a photo-alignment treatment a plurality of times by combining a photo-alignment treatment and mask patterns for providing a multi-domain structure. These methods require a plurality of complex additional steps. In particular, regarding the latter photo-alignment treatment with mask patterns, in a general photo-alignment by irradiating polarized ultraviolet rays, the light irradiation must be performed on a substrate two times, i.e., from the vertical direction and from a direction oblique to the substrate in order to generate and regulate the pretilt. It is suggested that, for example, in order to form a pixel composed of four domains, which is the same as that in the MVA mode, a light irradiation must be performed 8 times using four masks (for example, Non-Patent Document 2). In addition to the increase in the steps, for example, in the former mask rubbing, an alignment layer may be damaged or contaminated by applying or removing the resist. This may cause a deterioration of display image quality.

As described above, in the known arts, it is difficult to satisfy both high white luminance and wide viewing angle characteristics in the application that requires these characteristics, for example, in a liquid crystal display television.

In view of the above situation, it is an object of the present invention to provide a liquid crystal display device that can be fabricated more simply and is suitably used in a liquid crystal display television satisfying both high pixel transmittance and wide viewing angle display characteristics.

In order to achieve the above object, the present invention provides the following:

[1] A liquid crystal display device includes a pair of substrates including at least one transparent substrate, a liquid crystal layer interposed between the pair of substrates, and a liquid crystal alignment layer interposed between the liquid crystal layer and at least any one of the pair of substrates. On the liquid crystal alignment layer, a plurality of closed regions having a liquid crystal alignment direction different from the surrounding liquid crystal alignment direction is arranged. In the liquid crystal display device, each of the closed regions has such a shape that the head and tail are distinguishable along the surrounding liquid crystal alignment direction.

[2] In the liquid crystal display device according to item [1], the liquid crystal display device further includes a plurality of higher hierarchical regions (domains) in which the liquid crystal alignment directions of the periphery of the plurality of closed regions are different from each other.

[3] In the liquid crystal display device according to item [1] or item [2], at least one treatment for anchoring the liquid crystal orientation in the plurality of different directions is a treatment of irradiating light that can cause a chemical reaction on the surface of the substrate as linearly polarized light.

[4] In the liquid crystal display device according to item [1] or item [2], at least one treatment for anchoring the liquid crystal orientation in the plurality of different directions is a treatment of scanning with a fine probe that provides stress deformation on the surface of the substrate.

[5] In the liquid crystal display device according to item [1] or item [2], at least one treatment for anchoring the liquid crystal orientation in the plurality of different directions is a treatment of scanning with a ray of light that can cause a chemical reaction on the surface of the substrate.

[6] In the liquid crystal display device according to any one of items [1] to [5], the liquid crystal layer is composed of a liquid crystal material containing an asymmetric molecule as a component.

[7] In the liquid crystal display device according to any one of items [1] to [6], the liquid crystal display device further includes a pair of transparent electrodes each of which is disposed on each of the pair of substrates.

In view of the above object, according to the present invention, a multi-domain structure is applied to the orientation state (pretilt) itself of liquid crystal molecules on an alignment layer, which is required for a multi-domain structure in the TN mode, without using a mask rubbing or a simple photo-alignment including problems of increasing in the steps and the damage of an alignment layer.

Furthermore, an alignment layer including an orientation pattern having an appropriate two-dimensional symmetry is used in the present invention. As a result, the present invention can provide a liquid crystal display device satisfying both high pixel transmittance in the TN mode and wide viewing angle display characteristics due to a multi-domain structure.

The operation of an alignment layer including an orientation pattern of the present invention will now be described in detail.

In order that a multi-domain structure is applied to the orientation state (pretilt) itself of liquid crystal molecules on an alignment layer, as a prerequisite, the pretilt of liquid crystal molecules must be regulated in each pixel position on the alignment layer.

The photo-alignment is employed in order to prevent the damage caused by applying or removing a resist in the mask rubbing. In this case, however, as described above, an unrealistically large number of light irradiations and masks are required to domains divided into four. In order to decrease these numbers of irradiations and masks, in the photo-alignment, it is necessary to find a method of generating and anchoring the pretilt, the method including a step being different from the irradiation from an oblique direction and including fewer steps. In view of a process for forming a multi-domain structure by a photo-alignment with masks, a photo mask for dividing into regions, which is used for forming multi domains, is necessarily used. If the division into regions and the regulation of pretilt in each region can be achieved at the same time by optimizing the pattern itself of the above photo mask for dividing into regions, the number of irradiation steps can be decreased.

Next, in view of the generation mechanism of pretilt of liquid crystal molecules on an alignment layer, the tilt in the horizontal direction may be generated by breaking the symmetry of the head and tail in a plane along the alignment direction. Basically, the factor that brings the breaking of the symmetry to generate the tilt may be anything. For example, the factor may be the breaking of symmetry of the in-plane orientation pattern. A proof-of-principle experiment performed to confirm the postulation will be described.

In this experiment, a liquid crystal orientation pattern that was precisely regulated was prepared with an atomic force microscope (AFM). Specifically, the orientation pattern was prepared by scanning with a fine probe that can provide a deformation by a stress on the surface of a substrate to form an arbitrary pattern.

In this method, when the probe is scanned in one direction, a tilt is generated, whereas a symmetric reciprocating scanning does not generate the tilt. In the experiment, a specific in-plane orientation pattern was prepared by the latter symmetric reciprocating scanning. Specifically, a polyimide serving as an alignment layer was uniformly applied by spin coating on the surface of a substrate and the substrate was then heated to imidize. Subsequently, the surface of the resultant polyimide was uniformly subjected to a symmetric reciprocating scanning with an AFM probe along a specific direction. By the process above, the liquid crystal molecules have been uniaxially oriented on the alignment polyimide layer with a tilt of zero.

Subsequently, a concentric triangular pattern (the dimension from the center to the vertices was 1 μm) shown in FIG. 1 was scanned with the probe so that the center is disposed at a position of a lattice point of an orthogonal lattice having an appropriate interval on the surface of the polyimide. (In this way, when the same region was doubly scanned with an AFM probe equivalently to overwrite, the last scanning direction is the alignment direction.) In view of the entire pattern formed by combining the uniform uniaxial orientation of the underlayer and this triangular closed region pattern, the macroscopic average alignment direction of the liquid cryrtal is the scanning direction performed on the underlayer by the probe. In view of the symmetry of this pattern along this macroscopic in-plane alignment direction, the symmetry of the head and tail is broken. Accordingly, in the in-plane orientation pattern 1 in FIG. 1, the generation of pretilt is expected because of the breaking of the symmetry of the head and tail.

Subsequently, as shown in FIG. 2, a plurality of in-plane orientation patterns 1 in FIG. 1 was arranged on tetragonal lattice points on substrates to prepare a plurality of pairs of substrates 2. A pair of substrates 2 was combined so that the directionality of the pattern becomes antiparallel to prepare an empty cell. The cell was filled with a nematic liquid crystal (5 CB). The tilts of this liquid crystal cell were measured by a crystal rotation method. FIG. 3 shows the results. In FIG. 3, the abscissa indicates the number of triangular closed region patterns per side of a square region with sides of 100 μm, the square region having the orientation patterns thereon. The ordinate indicates the triple of the measured value of the tilt.

This result showed that a few degrees of pretilt could be provided as in a rubbing treatment by forming the above pattern in which the symmetry was appropriately set.

In the above proof-of-principle experiment, an AFM nano-rubbing was employed for the regulation of the liquid crystal orientation. Alternatively, the same effect can be achieved by an orientation patterning by a photo-alignment using photomasks.

As described above, in a pattern of a photo mask for dividing into regions, the mask being used for forming multi domains, the pattern itself is optimized so that the symmetry of the head and tail is broken along the orientation axis in each region. Thus, the division into regions and the regulation of pretilt in each region can be achieved at the same time. As a result, the number of irradiation steps and the number of photomasks can be decreased.

BEST MODE FOR CARRYING OUT THE INVENTION

According to the present invention, a liquid crystal display device that satisfies both wide viewing angle display characteristics due to a multi-domain structure and high transmittance in the TN mode and is suitably used in a liquid crystal display television can be provided by a simpler production process.

The liquid crystal display device of the present invention includes a pair of substrates including at least one transparent substrate, a liquid crystal layer interposed between the pair of substrates, and an alignment layer interposed between the liquid crystal layer and at least any one of the pair of substrates. In the alignment layer, a plurality of first hierarchical regions having a plurality of different axial directions of easy orientation of liquid crystal are arranged in the plane of the substrate. Furthermore, in the alignment layer, a plurality of second hierarchical regions having an axial direction of easy orientation of liquid crystal different from that of the corresponding first hierarchical region are arranged in each of the first hierarchical regions. Accordingly, both wide viewing angle display characteristics due to a multi-domain structure and high transmittance in the TN mode can be satisfied by a simple production process.

Embodiments of the present invention will now be described in detail.

Embodiment 1

Figure 4:
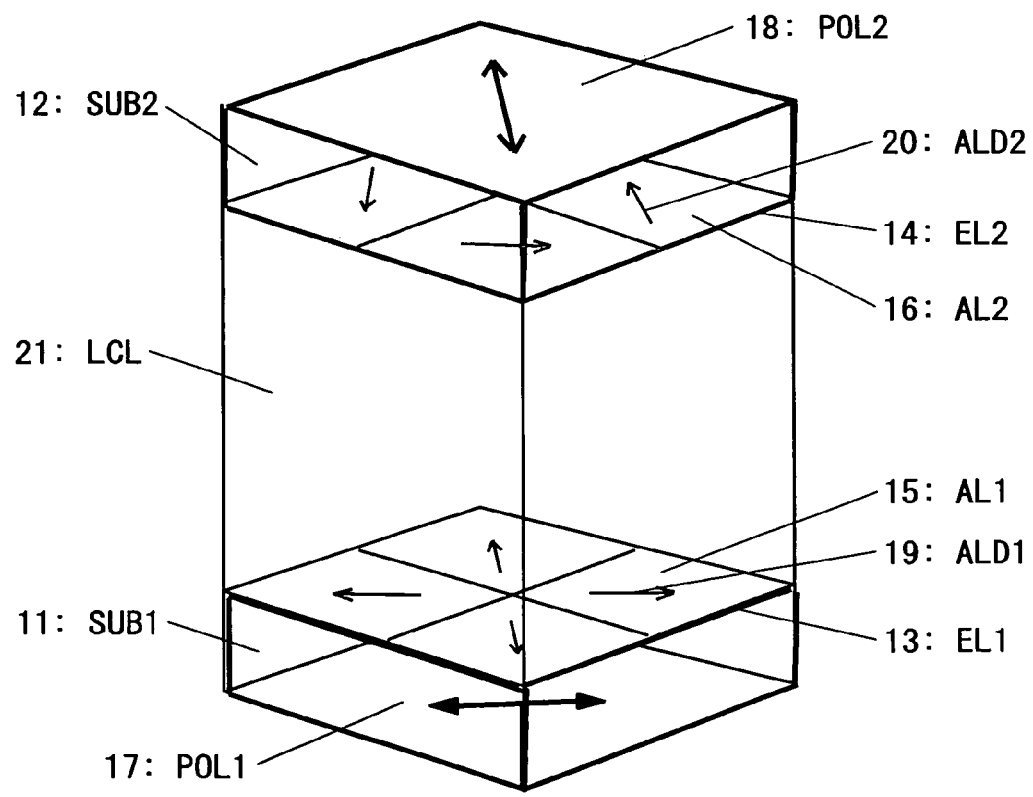
FIG. 4 is a view showing the structure of a liquid crystal display device according to Embodiment 1 of the present invention.

FIG. 4 is a view showing the structure of a liquid crystal display device according to Embodiment 1 of the present invention.

In the figure, reference numeral 11 indicates a substrate (SUB1), reference numeral 12 indicates another substrate (SUB2), reference numeral 13 indicates a transparent electrode (EL1), reference numeral 14 indicates another transparent electrode (EL2), reference numeral 15 indicates an alignment layer (AL1), reference numeral 16 indicates another alignment layer (AL2), reference numeral 17 indicates a polarizer (POL1), reference numeral 18 indicates another polarizer (POL2), reference numeral 19 indicates a liquid crystal alignment direction (ALD1), reference numeral 20 indicates another liquid crystal alignment direction (ALD2), and reference numeral 21 indicates a liquid crystal layer (LCL).

Two transparent glass substrates each having a thickness of 1.1 mm and a polished surface were used as the substrate 11 (SUB1) and the substrate 12 (SUB2). The transparent electrode 13 (EL1) and the transparent electrode 14 (EL2) were formed on the substrates 11 and 12, respectively. Each of the transparent electrodes 13 and 14 was formed as a transparent conductive layer composed of indium tin oxide (ITO). Subsequently, a densified photosensitive film was formed as follows on the transparent electrodes 13 and 14 of the substrates 11 and 12, respectively. A polyamic acid was synthesized using a diamine compound and an acid anhydride. The diamine compound was prepared by mixing a compound represented by chemical formula 1, which has a diazobenzene group, and equimolar 4,4'-diaminodiphenylmethane. Pyromellitic dianhydride and/or 1,2,3,4-cyclobutane tetracarboxylic dianhydride was used as the acid anhydride. The polyamic acid was applied on the surfaces of the substrates 11 and 12 and was baked at 200° C. for 30 minutes. In this step, instead of the compound represented by chemical formula 1, a compound represented by chemical formula 2 or chemical formula 3 may be used as a photosensitive material. All of these photosensitive films function as an alignment layer (photo-alignment layer). The alignment layer induces a homogeneous alignment of liquid crystal molecules with about zero degrees of pretilt angle in the direction orthogonal to linearly polarized light irradiated from a direction approximately perpendicular to the surface of the substrate.

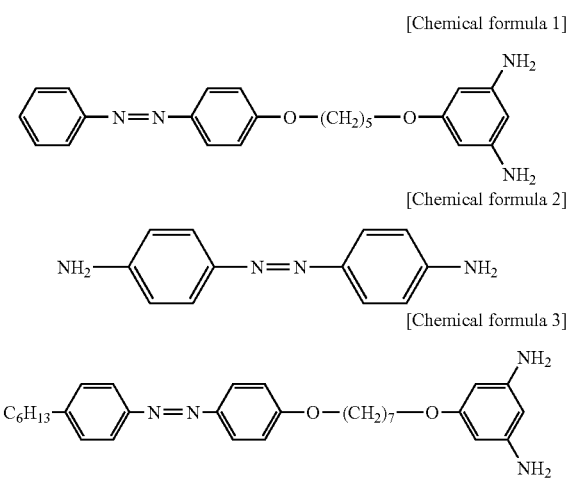

[Chemical formula 1]

[Chemical formula 2]

[Chemical formula 3]

Figure 1:
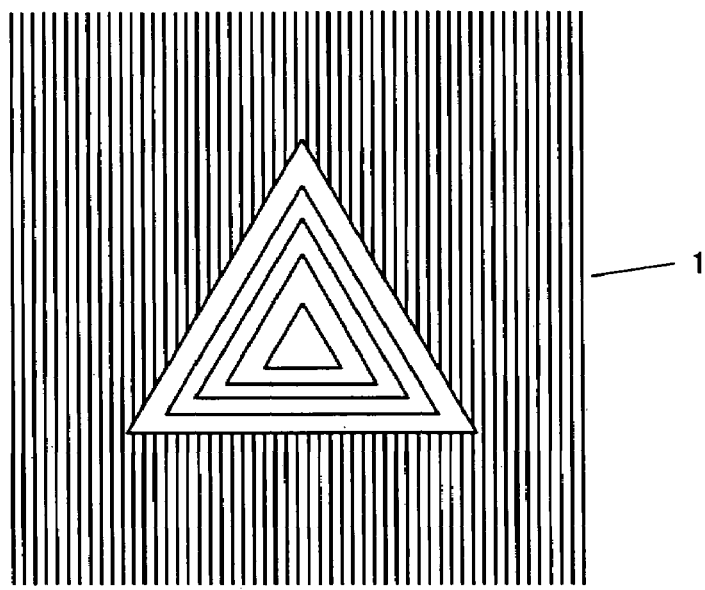
FIG. 1 is a schematic view showing a scanning pattern with a probe in a device used in a proof-of-principle experiment of the present invention.
Figure 2:
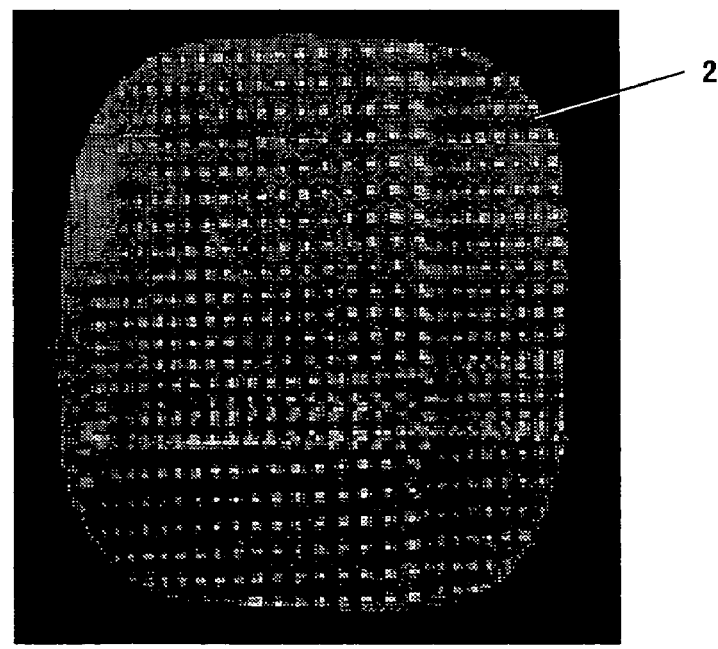
FIG. 2 is a view showing an arrangement of the scanning pattern in the device used in the proof-of-principle experiment of the present invention.
Figure 3:
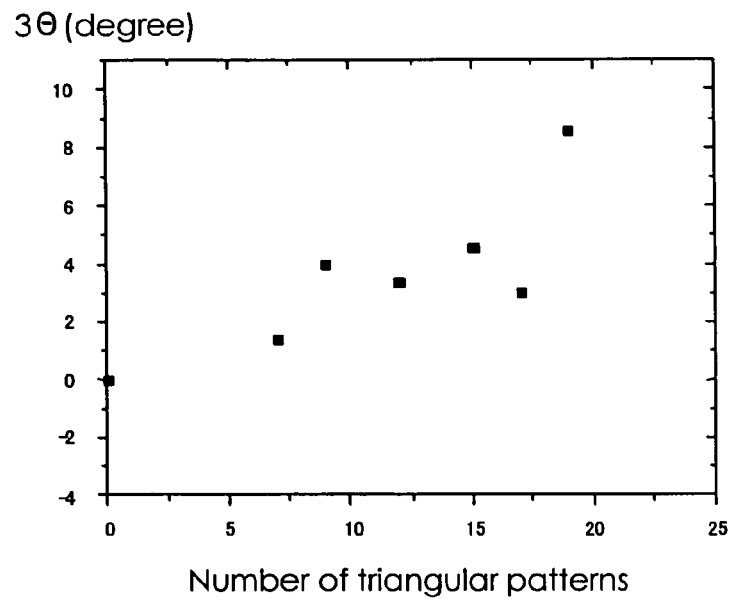
FIG. 3 is a graph showing a measurement result of the pretilt of the device used in the proof-of-principle experiment of the present invention.

Subsequently, the substrate 11 was irradiated with linearly polarized ultraviolet light, which was polarized with a polarizing element utilizing the Brewster's angle, by a mercury lamp serving as an ultraviolet light source from a direction approximately perpendicular to the surface of the substrate. The substrate 11 was irradiated with the linearly polarized ultraviolet light through a photomask 31 or 32 (the light was not transmitted through the black parts 31A and 32A) including a square checkerboard-shaped pattern shown in FIG. 5(a) or 5(b) two times at a light intensity of 10 mW/cm². In the schematic views of the photomasks in FIG. 5, a single triangle in each quarter domain (region) is shown as just a representation in order to indicate the direction of a large number of triangular closed region patterns that is formed in this domain as shown in FIG. 2. In the actual substrate, a large number of these triangular closed region patterns are arranged in each domain at a specific density.

The above two times of irradiation of linearly polarized ultraviolet light were performed as follows. The first irradiation was performed using the mask shown in FIG. 5(a) with ultraviolet light linearly polarized in the diagonal direction shown by line A-A' in the figure. The second irradiation was performed using the mask shown in FIG. 5(b) with ultraviolet light linearly polarized in the diagonal direction shown by line B-B' in the figure. In other words, the linearly polarization direction was rotated by 90 degrees. The polarized ultraviolet light was incident in the direction perpendicular to the surface of the substrate 11 such that the pretilt angle of liquid crystal orientation provided by the irradiation becomes approximately zero degrees. As a result of the two times of irradiation of linearly polarized ultraviolet light, the alignment layer 15 (AL1) including an alignment pattern in a direction orthogonal to the irradiated linearly polarized light was prepared. Specifically, as shown in the enlarged view shown in the circle in FIG. 5(c), the alignment layer 15 (AL1) included an irradiation pattern in which the direction of the linearly polarized light irradiated in the triangular closed region patterns was orthogonal to that in the background was formed in each domain so that the direction of each irradiation pattern was different from each other. It is assumed that the resultant orientation pattern provides the following effects. For example, among four divided domains 41 to 44 in FIG. 5(c), in the lower right domain 43, a pretilt is generated in the direction shown by a liquid crystal alignment direction (arrow) 47 (the arrow indicates a direction in which liquid crystal orientation tilts-up from the surface of the substrate). This pretilt is generated by breaking the symmetry of the head and tail due to the triangular closed region patterns 40 shown in the enlarged view in the circle. Also, in the other divided domains 41, 42, and 44 in which the in-plane orientation is different from each other by 90 degrees, a pretilt is generated in the directions shown by a liquid crystal alignment direction (arrows) 45, 46, and 48 in FIG. 5(c), respectively, according to the directions of the triangular closed region patterns in the domains 41, 42, and 44. In other words, the directions of the lines of the above arrows correspond to the liquid crystal alignment directions (45°, 135°, −135°, and −45° in the plane), and the arrow ends having a pointing end correspond to the direction in which liquid crystal molecules lift (i.e., tilt) from the surface of the substrate by a few degrees. In the same manner, as shown in FIG. 6(c), the patterned light alignment layer 16 (AL2) including similar four divided domains 61 to 64 was formed on the surface of the counter substrate 12 using photomasks 51 and 52 (the light was not transmitted through the black parts 51A and 52A) shown in FIGS. 6(a) and 6(b). The pair of substrates 11 and 12 was combined such that the orientation patterns were shown by FIG. 6(d) when viewed from above. Thus, so-called TN element structure was provided in which the liquid crystal orientation was twisted by about 90 degrees between the upper and lower substrates 11 and 12 in each of the four divided domains.

Figure 5:
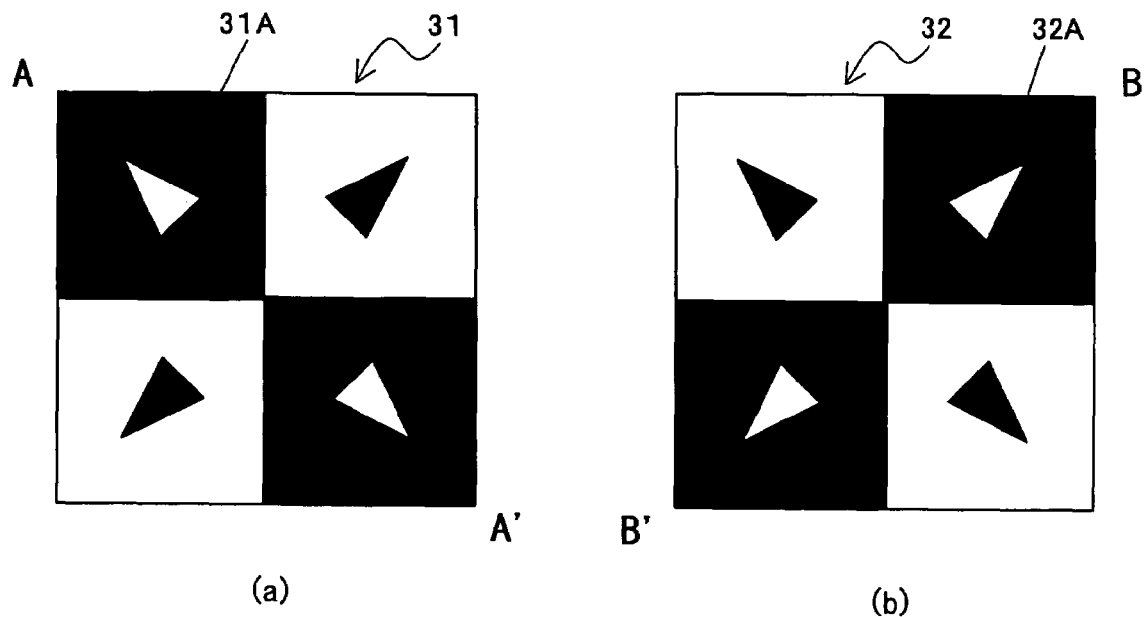
FIG. 5 includes schematic views showing photomasks used in Embodiment 1 of the present invention and an orientation pattern formed by the photomasks.
Figure 5:
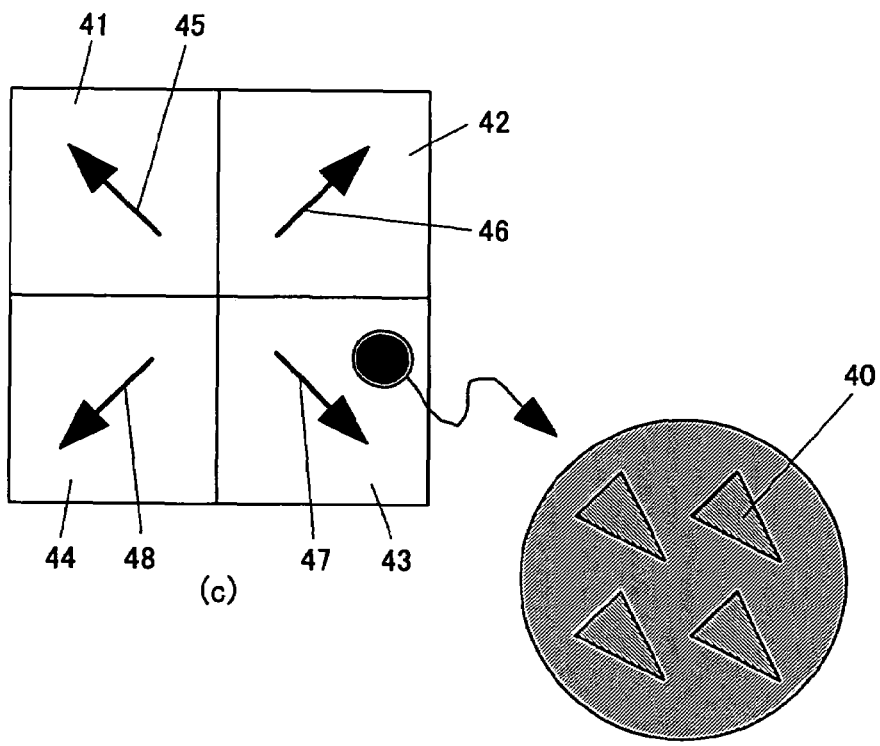
Figure 6:
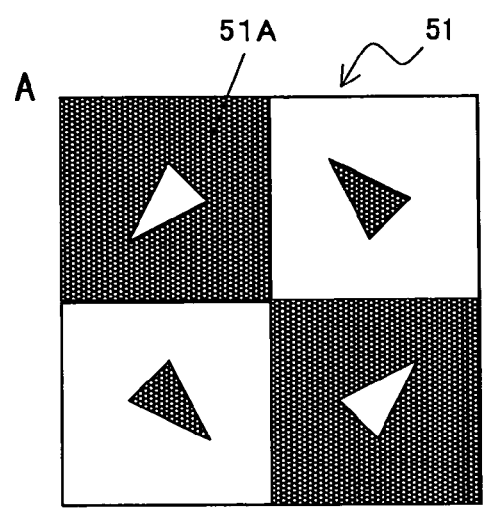
FIG. 6 includes schematic views showing photomasks used in a counter substrate of Embodiment 1 of the present invention and orientation patterns formed by the photomasks, which correspond to FIG. 5.
Figure 6:
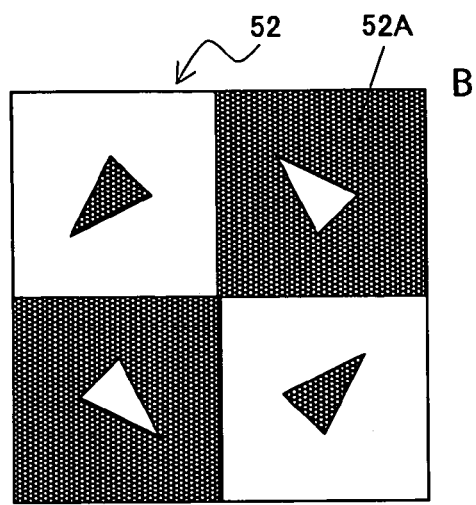
Figure 6:
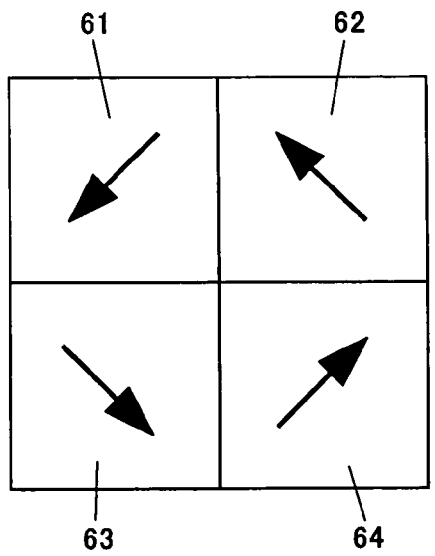
Figure 6:
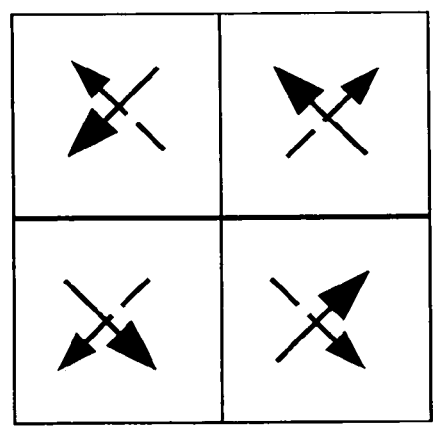

The method of division and the orientation patterns in FIGS. 5 and 6 are not limited to this example. The advantages of the present invention can be achieved as in this example so long as a method of division and orientation patterns provide the same pretilt effect and the same effect of widening of viewing angle due to the multi-domain structure.

Subsequently, these two substrates 11 and 12 were combined so that the surfaces that can orient liquid crystal molecules face each other. A spacer in which spherical polymer beads were dispersed and a surrounding sealant were disposed between the substrates to fabricate a cell.

Then, a nematic liquid crystal composition ZLI-4535 (the dielectric anisotropy Δε was positive and was 14.8, and the refractive index anisotropy Δn was 0.0865) 21 from Merck & Co., Inc. was injected between the substrates 11 and 12 of the above liquid crystal cell under vacuum. The liquid crystal cell was sealed with a sealant composed of a UV curable resin to prepare a liquid crystal panel.

The thickness of the liquid crystal layer 21 was controlled with the spacer so as to be 6.4 μm in the state where the liquid crystal was included. Accordingly, the retardation (Δnd) of the liquid crystal display device of this example was 0.5 μm.

Subsequently, this panel was sandwiched by two polarizers 17 (POL1) and 18 (POL2) (G1220DU from Nitto Denko Corporation). The polarizer 17 (POL1) was disposed so that the polarization transmission axis of the polarizer 17 (POLL) corresponded to the direction approximately parallel to the diagonal direction (A-A' or B-B') of the above the pattern that was divided into four domains. The other polarizer 18 (POL2) was disposed so that the polarization transmission axis thereof corresponded to the direction orthogonal to that of the polarizer 17 (POL1).

A driving circuit, a backlight, and the like were then connected to the panel to fabricate a liquid crystal display device.

For reference's sake, another liquid crystal cell was fabricated using the same material of alignment layer (alignment layer) and the same process as those in this example. However, in this liquid crystal cell, the alignment layer was formed on the entire surface of a substrate under the same condition as that of one of the above four divided domains under the same ultraviolet irradiation condition. The same liquid crystal composition ZLI-4535 filled between a pair of the same substrates to prepare the liquid crystal cell. The pretilt of this liquid crystal cell measured by a crystal rotation method was about 1 degree.

The liquid crystal display device in Embodiment 1 had a structure of a normally while mode TN display element. Therefore, when no voltage was applied, a high optical transmission state (i.e., white display) was obtained. Subsequently, when 5 Vpp of alternating voltage with a frequency of 1 kHz was applied between the transparent electrodes 13 (EL1) and 14 (EL2), a satisfactory low optical transmission state (i.e., black display) was obtained. Viewing angle characteristics of the liquid crystal display device in this embodiment were measured with a liquid crystal viewing angle measuring apparatus CV-1000 from Minolta Co., Ltd. According to the result, the display device had a wide viewing angle range, and specifically, the display device had a contrast ratio of 10:1 or more and had no tone reversal, over an entire range including an upper 140 degrees to a lower 140 degrees, and a left 140 degrees to a right 140 degrees. A visual inspection of image quality showed that no significant change in displayed color was observed even when the display device was viewed obliquely, and the display device provided highly uniform display. A pixel observation by a microscope during the white display showed that a decrease in transmittance in domain boundaries was small, the width of the domain boundaries was also small, and a high white luminance was obtained.

In a known art, for example, light irradiation must be performed 8 times per substrate to be processed in order to form a pixel composed of four divided domains. In contrast, according to the present invention, as described in the above embodiment, the light irradiation is performed only two times and thus the production can be significantly simplified.

COMPARATIVE EXAMPLE

Comparative Example to the present invention will now be described.

Figure 7:
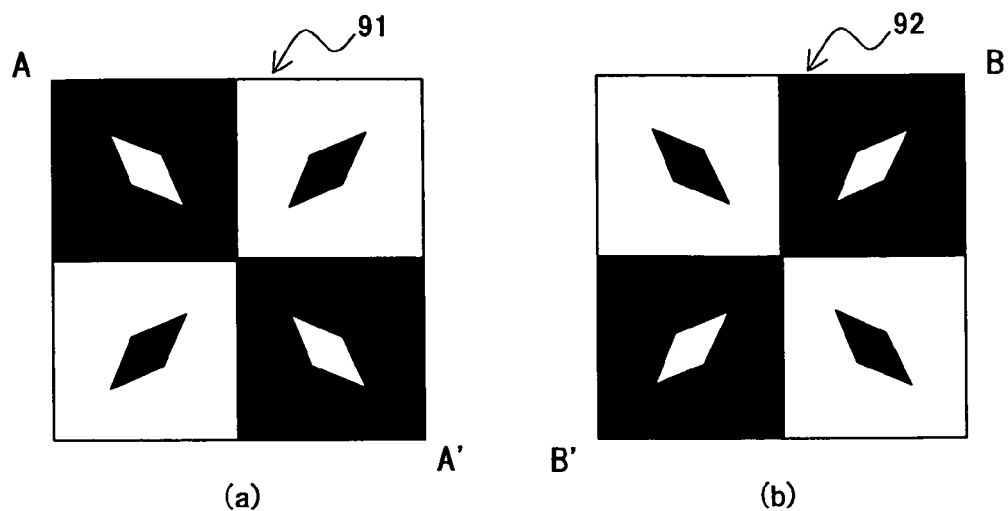
FIG. 7 includes schematic views showing photomasks used in Comparative Example in the present invention and an orientation pattern formed by the photomasks.

A liquid crystal display device of the Comparative Example was fabricated as in Embodiment 1, except that photomasks 91, 92, 101, and 102 shown in FIGS. 7(*a*), 7(*b*), 8(*a*), and 8(*b*), respectively, were used instead of the photomasks shown in FIGS. 5(*a*), 5(*b*), 6(*a*), 6(*b*) in Embodiment 1.

Figure 8:
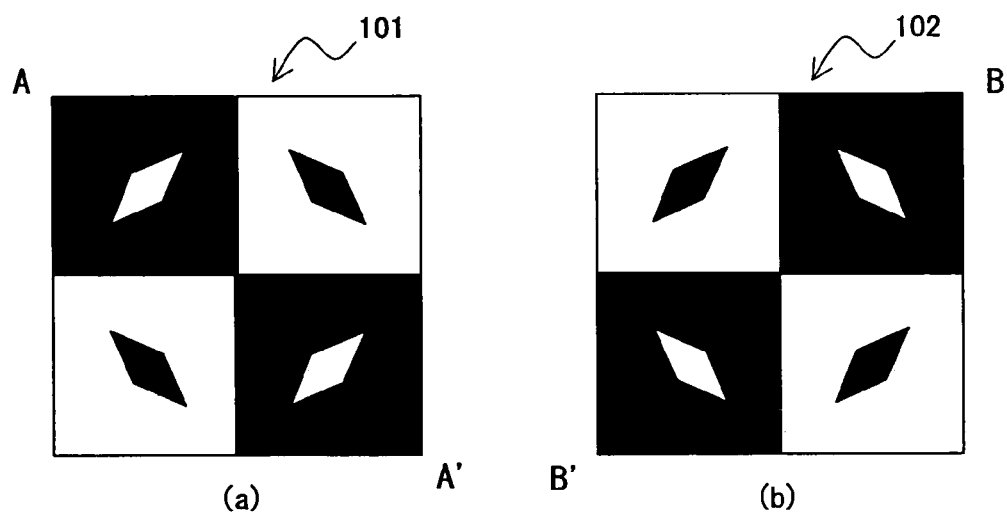
FIG. 8 includes schematic views showing photomasks used in a counter substrate of Comparative Example in the present invention and orientation patterns formed by the photomasks, which correspond to FIG. 7.
Figure 8:
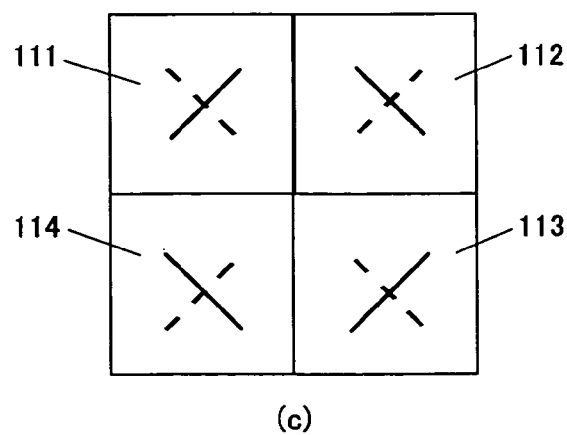

According to this comparative example, in the orientation pattern formed in each of the domains 111, 112, 113, and 114, the head and tail are symmetric along the average orientation direction. Consequently, as shown in FIG. 8(*c*), the liquid crystal molecules form a TN orientation with a homogeneous alignment with a pretilt of approximately zero degrees.

Accordingly, when a voltage was applied to the liquid crystal display device in this comparative example, the direction of the initial tilt was not regulated. Therefore, this device included a large number of domains in which the tilt was directed in the reverse direction. Consequently, the liquid crystal display device had a low display quality in the contrast and the like because of light leakage occurred in these domain boundaries (reverse tilt domains). Furthermore, when no voltage was applied, domains in which the twisting direction of liquid crystal orientation was directed in the reverse direction (reverse twist domains) were generated, resulting in the decrease in the white luminance.

Embodiment 2

Embodiment 2 of the present invention will now be described.

A liquid crystal display device of Embodiment 2 was fabricated as in Embodiment 1 except for the following. One of the substrates included an alignment layer having the orientation pattern (in FIG. 5) thereon. The other substrate did not include the alignment layer. Furthermore, a chiral dopant CB-15 from Merck & Co., Inc. was added to the liquid crystal material such that the length of helical pitch of the composition corresponded to about ¼ of the cell gap.

This liquid crystal display device provided the same advantages as those in Embodiment 1 except for the following. In this case, because of the function of the chiral dopant, a TN display structure as in Embodiment 1 was provided in which the liquid crystal orientation was twisted by about 90 degrees between the upper and lower substrates when no voltage was applied.

According to the measurement of the viewing angle by the same method as in Embodiment 1, the display device in Embodiment 2 also satisfied wide viewing angle characteristics approximately the same as those in Embodiment 1 to provide a highly uniform display.

Embodiment 3

Embodiment 3 of the present invention will now be described.

A liquid crystal display device of Embodiment 3 was fabricated as in Embodiment 1 except for the following. In Embodiment 1, the light irradiation was performed two times per substrate using two photomasks shown in FIGS. 5(*a*) and 5(*b*) for one substrate, and two photomasks shown in FIGS. 6(*a*) and 6(*b*) for the other substrate. Instead, in Embodiment 3, the light irradiation was performed three times per substrate using three photomasks 71 to 73 shown in FIGS. 9(*a*), 9(*b*), and 9(*c*), and three photomasks 81 to 83 shown in FIGS. 9(*d*), 9(*e*), and 9(*f*), respectively.

Figure 9:
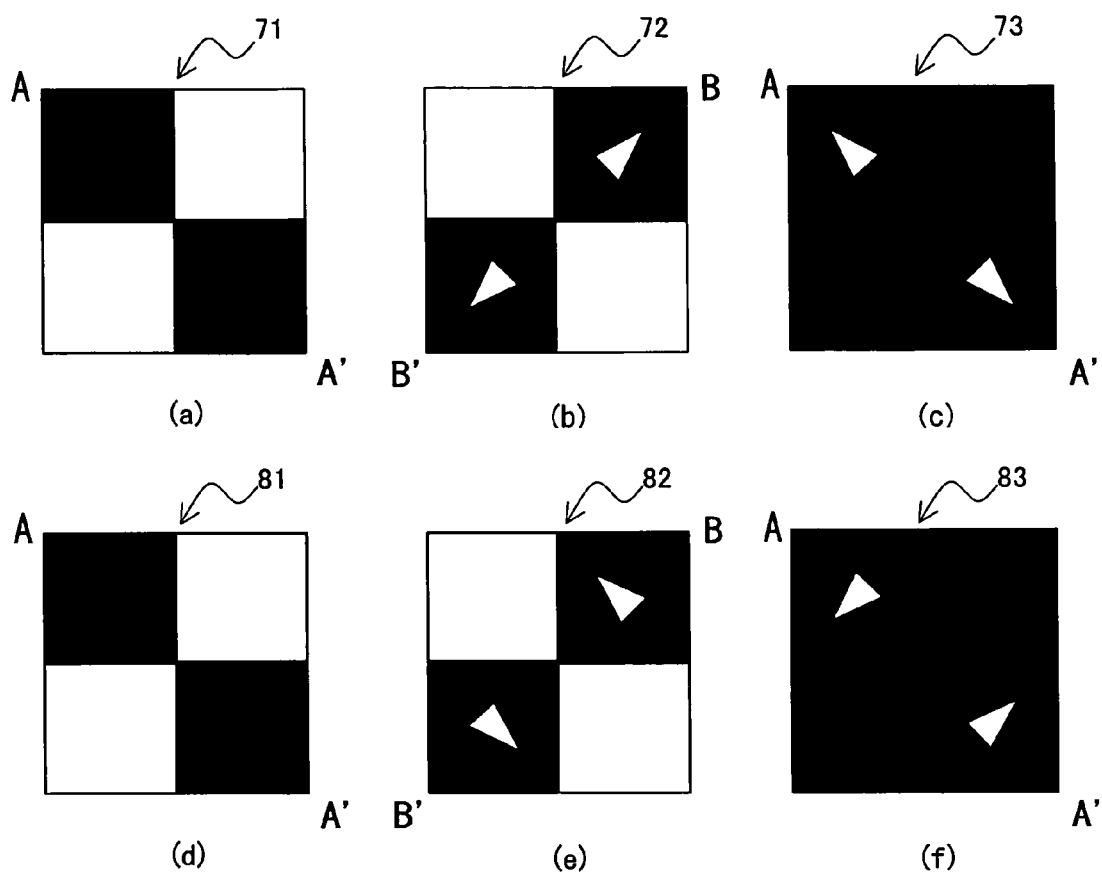
FIG. 9 includes schematic views showing photomasks used in Embodiment 3 of the present invention.

Each substrate was irradiated with linearly polarized ultraviolet light with the photomasks shown in FIGS. 9(*a*), 9(*b*), and 9(*c*), or with those shown in FIGS. 9(*d*), 9(*e*), and 9(*f*), in that order. The linearly polarized ultraviolet light was irradiated in the directions diagonal to lines A-A', B-B', and A-A', respectively.

In Embodiments 1 and 2, the light irradiation is performed only two times per substrate. However, during the two times of light irradiation, each photomask must be aligned with an accuracy on the order of the size of a large number of fine triangular closed region patterns disposed in each of the four divided domains (i.e., from several micrometers to between ten and twenty micrometers). Therefore, defects due to misalignment may be generated.

In contrast, in Embodiment 3, although each of the number of masks and the number of light irradiations per substrate is larger than that in Embodiment 1 by one, the alignment accuracy of each photomask is not on the order of the size of the fine triangular closed region patterns but on the order of the size of divided domains (i.e., from several tens of micrometers to between one hundred and two hundred micrometers). Thus, the required alignment accuracy of each photomask can be significantly reduced.

According to the measurement of the viewing angle by the same method as in Embodiment 1, the display device in this embodiment also satisfied wide viewing angle characteristics approximately the same as those in Embodiment 1 to provide a highly uniform display. In addition, the number of defects due to misalignment was decreased because the required alignment accuracy was reduced.

The present invention is not limited to the above examples. Various modifications can be made on the basis of the purpose of the present invention, and those modifications are not excluded from the scope of the present invention.

INDUSTRIAL APPLICABILITY

The liquid crystal display device of the present invention can be used for a liquid crystal display television satisfying both wide viewing angle display characteristics due to a multi-domain structure and high transmittance in the TN mode.

The invention claimed is:

1. A liquid crystal display device comprising a pair of substrates including at least one transparent substrate, a liquid crystal layer interposed between the pair of substrates, and a liquid crystal alignment layer interposed between the liquid crystal layer and at least any one of the pair of substrates and arranged with a plurality of closed regions having a liquid crystal alignment direction different from the surrounding liquid crystal alignment direction,
wherein each of the closed regions has such a shape that the head and tail are distinguishable along the surrounding liquid crystal alignment direction.

2. The liquid crystal display device according to claim 1, further comprising a plurality of higher hierarchical regions (domains) in which the liquid crystal alignment directions of the periphery of the plurality of closed regions are different from each other.

3. The liquid crystal display device according to claim 1, wherein at least one treatment for anchoring the liquid crystal orientation in the plurality of different directions is a treatment of irradiating light that can cause a chemical reaction on the surface of the substrate as linearly polarized light.

4. The liquid crystal display device according to claim 1, wherein at least one treatment for anchoring the liquid crystal orientation in the plurality of different directions is a treatment of scanning with a fine probe that provides stress deformation on the surface of the substrate.

5. The liquid crystal display device according to claim 1, wherein at least one treatment for anchoring the liquid crystal orientation in the plurality of different directions is a treatment of scanning with a ray of light that can cause a chemical reaction on the surface of the substrate.

6. The liquid crystal display device according to claim 1, wherein the liquid crystal layer comprises a liquid crystal material containing an asymmetric molecule as a component.

7. The liquid crystal display device according to claim 1, further comprising a pair of transparent electrodes each of which is disposed on each of the pair of substrates.

* * * * *